(12) United States Patent
Warren et al.

(10) Patent No.: US 6,383,116 B1
(45) Date of Patent: May 7, 2002

(54) TRANSMISSION SYSTEM

(75) Inventors: Robin John Warren, Leamington Spa; Charles John Jones, Coventry, both of (GB)

(73) Assignee: LuK Lamellen und Kupplungsbau GmbH, Buhl/Baden (DE)

( * ) Notice: Subject to any disclaimer, the term of this patent is extended or adjusted under 35 U.S.C. 154(b) by 0 days.

(21) Appl. No.: 09/692,657

(22) Filed: Oct. 19, 2000

(30) Foreign Application Priority Data

Oct. 20, 1999 (GB) ............................................. 9924693

(51) Int. Cl.⁷ ............................................. B60K 41/02
(52) U.S. Cl. ......................................................... 477/81
(58) Field of Search ............................... 477/81; 74/335

(56) References Cited

U.S. PATENT DOCUMENTS 5,761,628 A * 6/1998 Steeby et al. .................. 701/64
5,875,410 A * 2/1999 Fowler et al. ................. 701/64
6,014,603 A * 1/2000 Le Van .......................... 701/52
6,213,911 B1 * 4/2001 Salecker et al. ............... 477/97

* cited by examiner

Primary Examiner—Dirk Wright
(74) Attorney, Agent, or Firm—Darby & Darby

(57) ABSTRACT

A vehicle transmission system has a main drive clutch (14) with a clutch-actuator (20, 22, 38), a transmission (12) with a gear-engaging mechanism (25), a driver-operable gear-selector lever (24), and an electronic control means (36) to control the clutch-actuator (20, 22, 38) and the gear-engaging mechanism (25). When the vehicle is started up from a standstill condition, the control means disengages the clutch and automatically shifts the transmission into a pre-determined start-up gear. According to the invention, the electronic control means (36) is designed to allow the driver to operate the gear-selector lever (24) to select a higher start-up gear than the predetermined start-up gear that is selected automatically by the electronic control means.

10 Claims, 1 Drawing Sheet

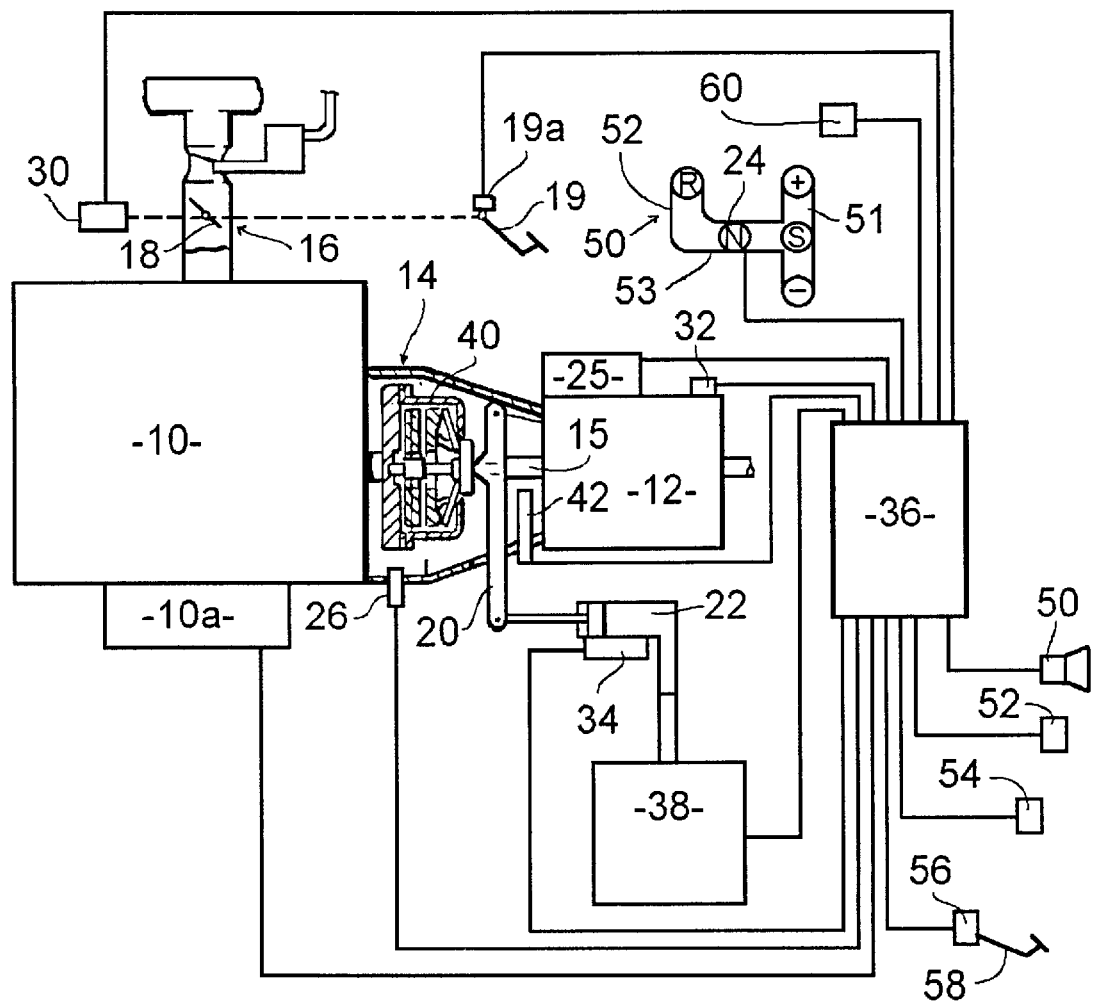

TRANSMISSION SYSTEM

BACKGROUND OF THE INVENTION

The present invention relates to a semi-automated or automated transmission system for a vehicle with a manual over-ride means such as a manual control input. Transmission systems of the kind that the invention relates to have a clutch, such as a main drive clutch, clutch-actuator means for controlling the state of engagement of the clutch, a multi-speed transmission, a gear-engaging mechanism for engaging an operative ratio of the transmission, and a driver-operable gear-selector lever allowing a driver to select the operative ratio.

With transmission systems of this type, when starting the vehicle from standstill, the clutch is taken out of engagement and a start-up gear is selected automatically. The clutch is then brought into engagement, while at the same time the throttle of the vehicle is being actuated. A transmission system of this type is disclosed in UK Patent No. 2302377. The content of said UK patent is hereby expressly incorporated by reference in the disclosure of the present application.

Conventionally, when the transmission system is put into drive, the first gear is automatically selected as the start-up gear. This is appropriate under normal road conditions. However, when traction on the road surface is reduced due, for example, to snow or ice, it may be desirable to select a higher gear ratio, for example second or even third gear, in order to reduce the torque applied to the driven wheels of the vehicle when starting up from a standstill condition.

OBJECT OF THE INVENTION

The object of the present invention is to improve a state-of-the-art transmission system of the type described above, so as to increase the level of comfort and safety of a vehicle that is equipped with a transmission system according to the invention.

SUMMARY OF THE INVENTION

The present invention meets the foregoing objective for a vehicle transmission system that includes a main drive clutch, clutch-actuator means for controlling the degree of engagement of the clutch, a transmission with a plurality of gear ratios, a gear-engaging mechanism for engaging an operative ratio of the transmission, a driver-operable gear-selector lever allowing the driver to select the operative ratio, and an electronic control means to control the clutch-actuator means and gear-engaging mechanism. The control means, which includes means for initiating a start-up from a standstill condition of the vehicle, is designed to disengage the clutch and to automatically shift into a start-up gear when the start-up phase of the vehicle is initiated from a standstill condition. According to the invention, if the driver selects a higher start-up gear by operating the gear-selector lever while the vehicle is at rest and the automatically selected start-up gear is engaged, the control means is designed to engage said higher start-up gear.

In accordance with the present invention, the driver may influence the selection of the start-up gear, e.g., in a case where the road conditions require a higher start-up gear than the one that is automatically engaged.

In accordance with one embodiment of the invention, the control means will automatically shift the transmission into first gear upon initiation of the start-up phase out of a standstill condition. The gear level may be increased to second or even third gear by appropriate movement of the gear-selector lever at a time when the vehicle is at rest with the automatically selected first gear engaged and before the throttle is actuated to set the vehicle in motion.

After increasing the start-up gear in this manner, the higher gear would be retained as the lowest ratio available, until deselected as described below. While the vehicle is in motion with a higher start-up gear imposed, gear levels equal and higher than the increased start-up gear may be engaged either manually or automatically. Changes to a lower gear level than the increased start-up gear would, however, be inhibited.

The higher start-up gear may be deselected by:

a) moving the gear-selector lever to select a lower gear while the vehicle is at rest with the higher start-up gear engaged;

b) switching off the transmission system;

c) canceling initiation of start-up while the vehicle is still at rest; or d) exceeding a predetermined speed which would normally be reached only under favorable driving conditions.

According to a preferred embodiment of the present invention, start-up from rest is initiated by movement of a drive-mode selector means from a "neutral" position to a "drive" position.

Further control of wheel slip at low speeds may be achieved by the imposition of third gear after second gear has been imposed manually as start-up gear, if wheel slip is detected in second gear. Wheel slip may be detected by means of anti-lock braking sensors, slip being defined as a state where the speed of a driven wheel exceeds the speed of a non-driven wheel by more than a predetermined amount (typically 50 rpm) while the vehicle is moving at less than 5 km/h and the throttle is opened less than a threshold amount (typically 15%).

The imposition of third gear may alternatively take place if the driver uses the gear-selector lever to instruct an up-shift while wheel slip is detected during start-up from a standstill condition. Imposition of third gear may be canceled by:

a) switching off the transmission system; or b) closing the throttle.

In accordance with a further embodiment of the invention, the driver may be required to take additional steps in order to avoid an unwanted increase of the start-up gear. For example, the driver may have to apply the main brake of the vehicle simultaneously with actuating the gear-selector lever.

The novel features that are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWING

The following description is based on the attached drawing which gives a schematic view of a semi-automatic transmission system in accordance with the present invention.

DETAILED DESCRIPTION OF PREFERRED EMBODIMENTS

The embodiments of the invention as described herein represent examples.

The accompanying drawing shows an engine 10 with a starter and associated starter circuit 10a that is coupled by way of the main drive friction clutch 14 and a transmission input shaft 15 to a multi-speed synchromesh transmission 12 with a countershaft. Fuel is supplied to the engine by a throttle 16 which includes a throttle valve 18 operated by accelerator pedal 19. The invention is equally applicable to gasoline as well as diesel engines with electronic or mechanical fuel injection.

The clutch 14 is actuated by a release fork 20 which is operated by a hydraulic slave cylinder 22, under the control of a clutch actuator control means 38.

A gear-selector lever 24 operates in a shift track 50 that has two legs 51 and 52 joined by a cross track 53 connecting the end of leg 52 and to a point between the ends of leg 51. The shift track 50 defines five positions: "R" at the end of leg 52; "N" intermediate of the ends of the cross track 53; "S" at the junction of leg 51 with the cross track 53; and "+" and "−" at the extremities of leg 51. In leg 51 the lever 24 is biased to the central "S" position. The "N" position of the selector lever 24 corresponds to neutral, "R" corresponds to selection of reverse gear, "S" corresponds to selection of a drive mode, momentary movement of the lever to the "+" position provides a command to cause the transmission to shift up one gear level and momentary movement of the gear lever 24 to the "−" position provides a command to cause the transmission to shift down one gear level.

The positions of the lever 24 are sensed by a series of sensors, for example micro switches or optical sensors, positioned around the gate 50. Signals from the sensors are fed to an electronic control unit 36. An output from the control unit 36 controls a gear-engaging mechanism 25, which engages the gear levels of the transmission 12 in accordance with movement of the selector lever 24 by the vehicle operator. The gear-engaging mechanism 25 may, for example, comprise hydraulic cylinders and solenoid control valves to move selector members to engage and disengage the various gear levels as disclosed, e.g., in WO 97/05410. The content of the latter publication is hereby expressly incorporated by reference in the disclosure of the present application.

In addition to signals from the gear-selector lever 24, the control unit 36 receives signals from:
  sensor 19a indicative of the degree of depression of the accelerator pedal 19;
  sensor 34 indicative of the degree of opening of the throttle control valve 18;
  sensor 26 indicative of the engine speed;
  sensor 42 indicative of the speed of the pressure plate of the clutch;
  sensor 34 indicative of the clutch slave cylinder position; and
  sensor 32 indicative of the gear level selected.

The control unit 36 utilizes the signals from these sensors to control actuation of the clutch 14 during start-up from standstill and during gear changes, for example as described in patent specifications EP 0038113, EP 0043660, EP 0059035, EP 0101220 and WO 92/13208. The contents of all of the preceding publications are hereby expressly incorporated by reference in the disclosure of the present application.

In addition to the abovementioned sensors, control unit 36 also receives signals from a sensor system 52 of an antilock braking system (ABS), from an ignition switch 54 and brake switch 56 associated with the main braking system, for example the footbrake 58 of the vehicle.

A buzzer 50 is connected to the control unit 36 to alert the vehicle operator as certain operating conditions occur. In addition to or in place of the buzzer 50, a flashing warning light or other indicating means may be used. A gear indicator 60 is also provided to indicate the gear ratio selected. With the system described above, when the vehicle is at rest, starting of the engine 10 by way of the ignition switch 54 will switch on the transmission system, and the control unit 36 will cause the clutch actuator means 38, 22, 20 to disengage the clutch 14. Movement of the gear lever 24 from the neutral "N" position to the drive position "S" will then cause the control unit 36 to actuate the gear-engaging mechanism 25 to engage the lowest forward gear level (first gear). As the accelerator pedal 19 is depressed to drive off, the control unit 36 will cause the clutch actuator means 38, 22, 20 to re-engage the clutch 14 to set the vehicle in motion. The re-engagement of the clutch 14 in the start-up phase just described is controlled by the control unit 36 in the manner disclosed, for example, in EP 0038113; EP 0696341 or EP 0735957, in order to ensure a smooth start-up behavior. The contents of the aforementioned publications are hereby expressly incorporated by reference in the disclosure of the present application.

If the gear lever 24 is moved momentarily to the "+" position after switching on the transmission system and moving the gear lever 24 from "N" to "S", but before depressing the accelerator pedal 19 to set the vehicle in motion, the control unit 36 will cause the gear-engaging mechanism 25 to shift the transmission into second gear as the start-up gear. Subsequently, as the accelerator pedal 19 is depressed, the transmission system will start to deliver traction in the higher start-up gear.

By starting the vehicle in a higher gear in the manner disclosed above, the amount of torque applied to the driven wheels of the vehicle is lowered, which reduces the risk of wheel slip when starting under adverse road conditions where traction may be reduced.

Once the start-up gear has been increased in the manner described above, second gear will remain the lowest gear ratio available until the higher start-up gear is deselected. Consequently, after start-up is completed, it will be possible to shift up from second gear into third, fourth and fifth gear and between third, fourth and fifth gears, but shifting down from second to first gear will be inhibited. Moreover, second gear will continue to be automatically selected as start-up gear until it is deselected.

The manually selected start-up gear may be deselected by utilizing one of the following options:
  a) moving the gear-selector lever 24 to the "−" position while the vehicle is at rest with the higher start-up gear engaged;
  b) switching off the transmission system by means of ignition switch 54;
  c) moving gear lever 24 from the "S" to the "N" position; or
  d) accelerating the vehicle to a speed in excess of a predetermined value which would normally be exceeded only under favorable driving conditions.

In accordance with a modification of the embodiment described above, the start-up gear may be increased further to third gear by moving the gear lever 24, a second time to the "+" position.

In accordance with the above embodiments once start-up has commenced upon depression of the accelerator pedal 19, subsequent changes of the gear level occurring either automatically or in response to actuation of the gear-selector lever 24 are inhibited until start-up is deemed to have been completed. Completion of the start-up process may be taken as the point at which the pressure plate of the clutch and the engine have reached the same rpm rate. However, it is preferred to select a completion point at which the engine speed exceeds the speed of the pressure plate of the clutch by a set amount (typically 50 rpm).

In accordance with a further modification of the embodiments illustrated above, if wheel slip is detected during start-up in second gear, the start-up gear may be further increased to third gear, either automatically under the control of control unit 36 or in response to movement of gear lever 24 to the "+" position.

The occurrence of wheel slip may be communicated to the control unit 36 by the ABS sensor system 52, which would send a signal when the speed of a driven wheel exceeds the speed of a non-driven wheel by more than a predetermined amount (typically 50 rpm) while the vehicle is moving at less than 5 km/h and the throttle is opened less than a threshold amount (typically 15%).

The imposition of 3rd gear as start-up gear may be canceled by:
  a) turning off the transmission system by means of the ignition switch; or
  b) releasing the accelerator pedal 19.

In accordance with a further modification of the above embodiments, a higher start-up gear may only be imposed, if the footbrake 58 is applied, as indicated by a signal from brake switch 56, while the gear-selector lever 24 is moved to the "+" position to initiate an increase in the start-up gear.

Various modifications may be made without departing from the invention. For example while in the above embodiments hydraulic means are used for actuation of the clutch and gear-selector lever mechanism; hydraulic, pneumatic and/or electrical actuators, for example electric motors or solenoids, may be used as disclosed, e.g., in DE 19504847; WO 97/10456 or DE 19734023. The contents of all of the preceding publications are hereby expressly incorporated by reference in the disclosure of the present application.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. A vehicle transmission system comprising a main drive clutch, a clutch-actuator means for controlling a degree of engagement of the main drive clutch, a transmission with a plurality of ratios, a gear-engaging mechanism for engaging an operative ratio of said transmission, a gear-selector lever that is operable by a driver for selecting said operative ratio, and an electronic control means for controlling the clutch-actuator means and the gear-engaging mechanism, wherein the control means includes a starter means for initiating a start-up phase from a standstill condition of the vehicle, said control means being operative to disengage the clutch and to automatically shift the transmission into a predetermined start-up gear when the start-up phase is initiated from the standstill condition, said control means further being operative to shift the transmission into a higher start-up gear than said predetermined start-up gear, if the driver selects the higher start-up gear through the gear-selector lever while the vehicle is in the standstill condition and the predetermined start-up gear is engaged.

2. The vehicle transmission system of claim 1, wherein the transmission comprises at least a first gear, a second gear, and a third gear, wherein further the predetermined start-up gear is the first gear, and the higher start-up gear is one of the second gear and the third gear.

3. The vehicle transmission system of claim 1, wherein the higher start-up gear is retained as the lowest gear available, until the driver deselects the higher start-up gear.

4. The vehicle transmission system of claim 3, wherein the higher start-up gear is deselected by taking at least one of the steps of:
  a) moving the gear-selector lever to select a lower gear while the vehicle is at rest with the higher start-up gear engaged;
  b) switching off the transmission system;
  c) canceling initiation of the start-up phase while the vehicle is still in the standstill condition; and
  d) exceeding a predetermined speed which, in a normal situation, would be reached only if the vehicle is proceeding under favorable driving conditions.

5. The vehicle transmission system of claim 1, wherein the gear-selector lever has at least a neutral position and a drive position, and the start-up phase from the standstill condition of the vehicle is initiated by moving the gear-selector lever from the neutral position to the drive position.

6. The vehicle transmission system of claim 2, wherein the control means can impose a shift into third gear, if wheel slip is detected after the start-up gear has been raised to the second gear.

7. The vehicle transmission system of claim 6, wherein the vehicle has driven wheels and non-driven wheels and wheel slip is defined as a state where a driven wheel spins faster than a non-driven wheel by more than a preset rpm difference.

8. The vehicle transmission system of claim 7, further comprising a throttle with a variable opening, wherein the preset rpm difference is 50 rpm and wherein additional conditions for the control means to impose the third gear are that the vehicle is moving at less than 5 km/h and said opening is below a predetermined threshold.

9. The vehicle transmission system of claim 8, wherein the predetermined threshold is 15%.

10. The vehicle transmission system of claim 6, further comprising a throttle with a variable opening, wherein the imposition of third gear can be canceled by:
  a) switching off the transmission system; or
  b) closing the throttle.

* * * * *